US009662972B2

(12) United States Patent
Cisternino et al.

(10) Patent No.: US 9,662,972 B2
(45) Date of Patent: May 30, 2017

(54) DRAINING FUEL NOZZLE-RECEIVING ASSEMBLY

(71) Applicant: ILLINOIS TOOL WORKS INC., Glenview, IL (US)

(72) Inventors: Franco A. Cisternino, Deerfield, IL (US); Paul M. Sutenbach, Highland Park, IL (US); Stephen M. Sperando, Glen Ellyn, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 14/769,142

(22) PCT Filed: Feb. 8, 2014

(86) PCT No.: PCT/US2014/015452
§ 371 (c)(1),
(2) Date: Aug. 20, 2015

(87) PCT Pub. No.: WO2014/133731
PCT Pub. Date: Sep. 4, 2014

(65) Prior Publication Data
US 2016/0001653 A1 Jan. 7, 2016

Related U.S. Application Data

(60) Provisional application No. 61/769,316, filed on Feb. 26, 2013.

(51) Int. Cl.
*B60K 15/04* (2006.01)
*B60K 15/05* (2006.01)
(52) U.S. Cl.
CPC .............. *B60K 15/05* (2013.01); *B60K 15/04* (2013.01); *B60K 2015/0458* (2013.01); *B60K 2015/053* (2013.01)

(58) Field of Classification Search
CPC B60K 15/04; B60K 15/05; B60K 2015/0458; B60K 2015/0461; B60K 2015/053
(Continued)

(56) References Cited

U.S. PATENT DOCUMENTS 5,056,570 A * 10/1991 Harris .............. B60K 15/03519
141/302
5,271,438 A * 12/1993 Griffin ................... B60K 15/04
141/302

(Continued)

FOREIGN PATENT DOCUMENTS

| CN | 101160224 | 4/2008 |
| CN | 101258045 | 9/2008 |

(Continued)

OTHER PUBLICATIONS

ISR and WO for PCT/US2014/015452 mailed Apr. 16, 2014.

*Primary Examiner* — Nicolas A Arnett
(74) *Attorney, Agent, or Firm* — Joseph M. Butscher; The Small Patent Law Group, LLC

(57) ABSTRACT

A fuel nozzle-receiving assembly may include a main housing having an inlet configured to receive a fuel nozzle, a drain opening formed through a portion of the main housing, and a drain cover configured to be moved between a plugged position in which the drain opening is closed, and an unplugged position in which the drain opening is opened. The drain cover is configured to be in the plugged position when the fuel nozzle is inserted into the inlet so that any leaked fuel passes into the inlet.

22 Claims, 9 Drawing Sheets

(58) Field of Classification Search
USPC .................................. 141/348–350; 220/86.2
See application file for complete search history.

(56) References Cited

U.S. PATENT DOCUMENTS

| | | | |
|---|---|---|---|
| 5,437,317 A | | 8/1995 | Takatsuka |
| 5,538,055 A | | 7/1996 | Kunz |
| 5,730,194 A | * | 3/1998 | Foltz .................. B60K 15/04 |
| | | | 137/588 |
| 6,189,581 B1 | * | 2/2001 | Harris ................ B60K 15/04 |
| | | | 137/588 |
| 6,539,990 B1 | * | 4/2003 | Levey ............... B60K 15/0406 |
| | | | 141/301 |
| 6,789,586 B2 | * | 9/2004 | Levey ............... B60K 15/0406 |
| | | | 141/350 |
| 7,007,726 B1 | | 3/2006 | Martin |
| 7,055,560 B1 | | 6/2006 | Sexton |
| 8,215,333 B2 | * | 7/2012 | Stokes ................ B60K 15/04 |
| | | | 137/312 |
| 9,457,650 B2 | * | 10/2016 | Aitken ................ B60K 15/05 |
| 2010/0313969 A1 | | 12/2010 | Stokes et al. |

FOREIGN PATENT DOCUMENTS

| | | |
|---|---|---|
| EP | 0602433 A2 | 6/1994 |
| GB | 2240096 A | 7/1991 |

\* cited by examiner

DRAINING FUEL NOZZLE-RECEIVING ASSEMBLY

RELATED APPLICATIONS

This application is a National Phase of PCT/US2014/015452 filed Feb. 8, 2014 and relates to and claims priority benefits from U.S. Provisional Patent Application No. 61/769,316 filed Feb. 26, 2013, which is hereby incorporated by reference in its entirety.

FIELD OF THE DISCLOSURE

Embodiments of the present disclosure generally relate to fuel intake systems of vehicles, and more particularly, to fuel intake assemblies that are configured to drain pooled liquids, such as water, and ensure that fuel passes to a fuel tank.

BACKGROUND OF THE DISCLOSURE

Various vehicles, such as automobiles, include fuel systems having a tank configured to retain fuel, such as gasoline or diesel fuel, and a fuel fill pipe that serves as an inlet for supplying fuel to the tank from a fuel nozzle of a refueling station. In general, a fuel fill pipe includes an opening that may be exposed during refueling to receive the nozzle. An exposed end portion of the fuel pipe is of sufficient size to receive a discharge tube of a refueling nozzle. The nozzle typically fits relatively loosely in the fuel fill pipe so that the nozzle may be quickly and easily inserted and removed from the fuel fill pipe.

Typical capless refueling systems provide a drain hole in a mis-fuel inhibitor (MFI). An MFI is a device configured to prevent a gas nozzle from being inserted into a diesel fuel tank, or vice versa. The drain hole allows pooled liquid to drain or otherwise escape. Before, during, or after refueling, if a user overfills the fuel tank, fuel may overflow and fill the MFI. As such, fuel may leak through the drain.

A fuel nozzle-receiving assembly, which may include an MFI, is configured to receive a fuel nozzle and guide it into a fuel fill line connected to a fuel tank. A drain is typically located at a lower portion of the fuel nozzle-receiving assembly. As such, liquid, such as water, within the assembly is able to drain out, instead of passing into the fuel tank. For example, a covering puck prevents the pooled liquid from passing into the fuel fill line, so that the pooled liquid flows out of the assembly through the drain. However, the drain may undesirably drain fuel out of the assembly when the fuel is intended to be channeled to the fuel tank. For example, during a refueling operation, the drain may be open, thereby diverting fuel within the assembly away from the fuel tank.

SUMMARY OF THE DISCLOSURE

Certain embodiments of the present disclosure provide a fuel nozzle-receiving assembly that may include a main housing having an inlet configured to receive a fuel nozzle, a drain opening formed through a portion of the main housing, and a drain cover configured to be moved between a plugged position in which the drain opening is closed, and an unplugged position in which the drain opening is opened. The drain cover is configured to be in the plugged position when the fuel nozzle is inserted into the inlet so that any leaked fuel passes into the inlet. The drain cover may be configured to be in the unplugged position when the fuel nozzle is not inserted into the inlet so that liquid within the main housing drains through the drain opening.

The assembly may also include a movable inlet cover configured to be moved between a closed position in which the inlet cover covers at least a portion of the inlet and an open position in which the inlet is opened. The drain cover is configured to be in the unplugged position when the inlet cover is in the closed position, and in the plugged position when the inlet cover is in the open position.

In at least one embodiment, the assembly may include a drain covering link pivotally secured to the main housing, and an inlet cover pivotally secured to the main housing. Movement of the inlet cover to an open position forces the drain covering link to move the drain cover toward the plugged position. The drain covering link may include a cover spur at a first end and the drain cover at a second end that is opposite from the first end. At least a portion of the inlet cover is configured to engage the cover spur to move the drain cover between the plugged and unplugged positions.

In at least one embodiment, the assembly may include an actuator operatively connected to the drain cover. The actuator may be configured to expand to move the drain cover to the plugged position, and retract to move the drain cover to the unplugged position. A spring-biased C-ring may be secured around the actuator.

An inlet cover may be configured to be moved between open and closed positions. Movement of the inlet cover toward the open position causes the actuator to expand, while movement of the inlet cover toward the closed position causes the actuator to retract.

In at least one embodiment, the drain cover may include a drain covering sleeve slidably retained within a sleeve-retaining track. The drain covering sleeve may be spring-biased. The drain covering sleeve may be configured to be inwardly moved to the plugged position by insertion of the fuel nozzle into the inlet, and outwardly biased in the unplugged position to expose the drain plug.

Certain embodiments of the present disclosure provide a fuel nozzle-receiving assembly that may include a main housing defining an internal chamber and including an inlet configured to receive a nozzle, a drain opening formed through a portion of the main housing, wherein the drain opening is configured to allow liquid to drain therethrough, and a drain cover configured to be moved between a plugged position in which the drain opening is closed so that liquid is prevented from passing therethrough, and an unplugged position in which the drain opening is opened so that the liquid is able to pass therethrough. The drain cover is configured to be in the plugged position when the nozzle is inserted into the inlet. The drain cover is configured to be in the unplugged position when the nozzle is not inserted into the inlet.

Figure 1:
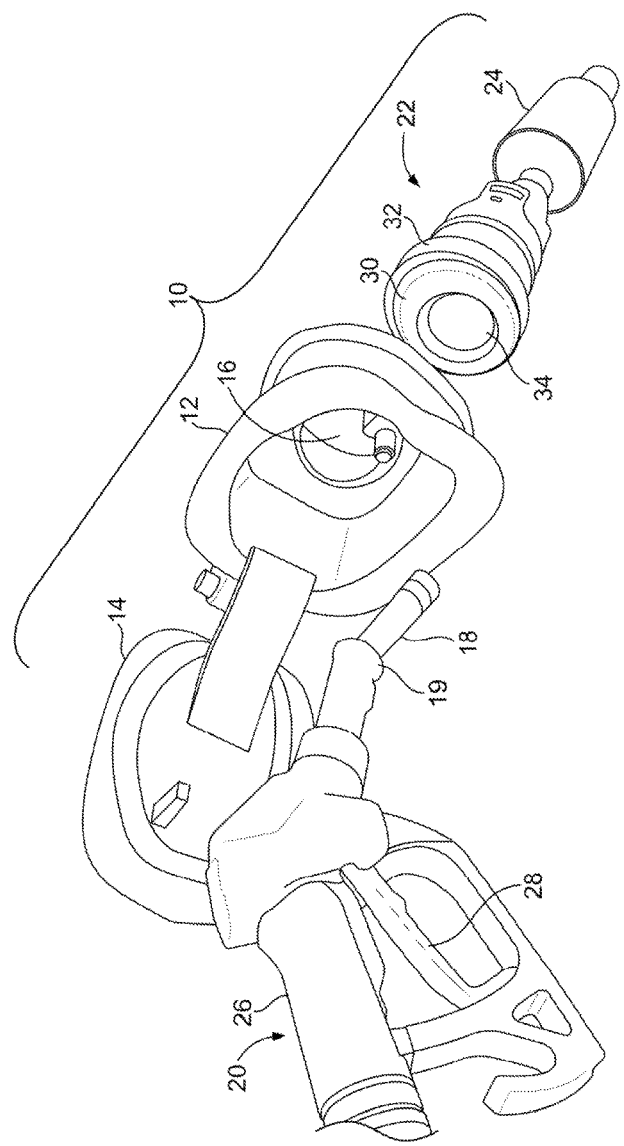
FIG. 1 illustrates a perspective view of a fuel intake system, according to an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE DISCLOSURE

Embodiments of the present disclosure provide fuel nozzle-receiving assemblies that are configured to allow undesired liquid, such as water, to drain out, and prevent fuel from leaking out. If an overfill occurs, the fuel may be temporarily contained within the assembly, before flowing back into the fuel pipe.

FIG. 1 illustrates a perspective view of a fuel intake system 10, according to an embodiment of the present disclosure. The fuel intake system 10 may include a nozzle-receiving housing 12, which may be secured to a frame of a vehicle, for example. The nozzle-receiving housing 12 may include a door 14 that pivotally connects to the housing 12. The door 14 is configured to be pivoted between open and closed positions. The housing 12 defines an opening 16 into which a nozzle 18 of a fuel-dispensing device 20 may be inserted.

The housing 12 may directly or indirectly connect to a mis-fuel inhibitor (MFI) assembly 22. The MFI assembly 22 is configured to prevent improper fuel-dispensing devices (for example, fuel-dispensing devices that are incompatible with the fuel intake system 10) from dispensing fuel into a fuel fill pipe 24 connected to the MFI assembly 22. For example, the MFI assembly 22 prevents a diesel fuel-dispensing device from being inserted into a gasoline fuel intake system, or vice versa. A diesel fuel-dispensing device is an improper or incompatible fuel-dispensing device in relation to a gasoline fuel intake system, while a gasoline fuel-dispensing device is an improper or incompatible fuel-dispensing device in relation to a diesel fuel intake system.

The fuel-dispensing device 20 includes a handle 26 operatively connected to a trigger 28. The handle 26 is configured to be grasped by an operator and connects to the nozzle 18.

A capless cover 30 may be secured to an inlet end 32 of the MFI assembly 22. The capless cover 30 includes a moveable door 34 configured to be engaged by a distal end of the fuel nozzle 18. The capless cover 30 may be opened through the fuel nozzle 18 being urged into the moveable door 34, as opposed to an individual grasping and removing a cap, such as a threaded cap, that would otherwise be secured to the MFI assembly 22. Alternatively, instead of the capless cover 30, the fuel intake system 10 may include a cap that threadably engages the inlet end 32 of the MFI assembly 22, and is configured to be grasped by an individual and removed, such as by the individual rotating the cap off of the inlet end 32.

The MFI assembly 22 and the capless cover 30 are examples of fuel intake or nozzle-receiving assemblies. Embodiments of the present disclosure may be used with various types of fuel intake or nozzle-receiving assemblies, such as the MFI assembly 22, the capless cover 30, inlet ends of the fuel fill pipe 24, and the like.

Figure 2:
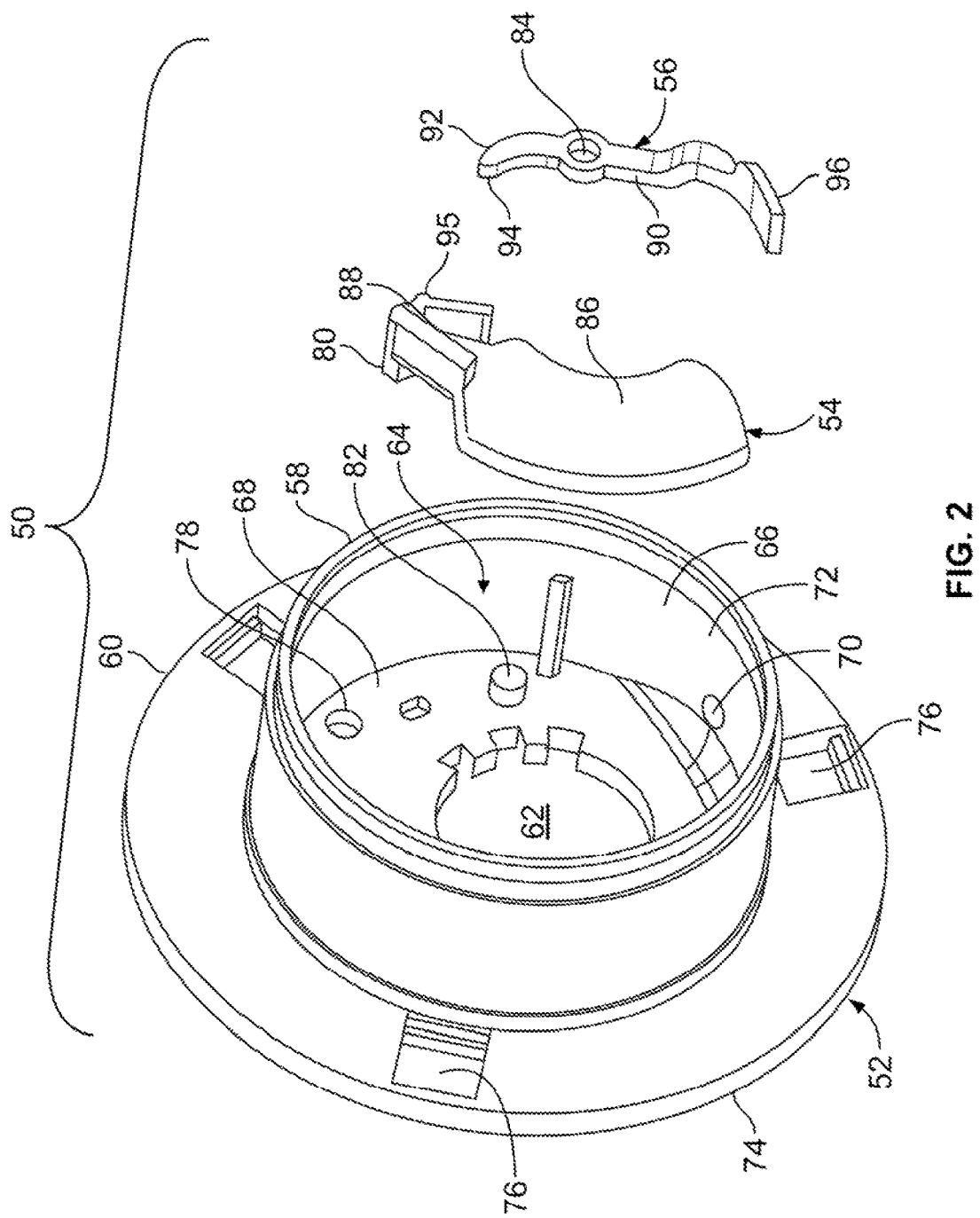
FIG. 2 illustrates a perspective exploded view of a fuel nozzle-receiving assembly, according to an embodiment of the present disclosure.

FIG. 2 illustrates a perspective exploded view of a fuel nozzle-receiving assembly 50, according to an embodiment of the present disclosure. The fuel nozzle-receiving assembly 50 may be a mis-fuel inhibitor (MFI) assembly, a capless assembly, a portion of a fuel fill pipe, and/or the like. The assembly 50 may include a main housing 52. An inlet cover 54, such as a puck, panel, flap, sheet, or the like, is moveably secured within the main housing 52. The inlet cover 54 may be linked to the main housing 52 by a drain-covering link 56.

The main housing 52 may include a tubular, circumferential receiving wall 58 that outwardly and perpendicularly extends from a planar base 60. An inlet 62 may be formed through the base 60, and the receiving wall 58 may extend around the inlet 62. An internal chamber 64 is defined between internal surfaces 66 of the receiving wall 58 and a front surface 68 of the base 60. A drain opening 70 is formed through the receiving wall 58 at a lower portion 72 proximate to the front surface 68 of the base 60.

The base 60 may also include a flange 74 that extends radially outward from the receiving wall 58. The flange 74 may include one or more openings 76 configured to securely mate to reciprocal protuberances of a fuel fill pipe, a capless assembly, an MFI, or the like. For example, the openings 76 may snapably engage reciprocal tabs formed on a fuel fill pipe to secure the assembly 50 to the fuel fill pipe.

A cover pivot opening 78 may be formed through the base 60 within the internal chamber 64. The cover pivot opening 78 is configured to pivotally retain a cover pivot member 80, such as a tubular post, nub, stud, or the like, of the inlet cover 54. As shown, the cover pivot opening 78 may be positioned above and to a side of the inlet 62. Alternatively, the base 60 may include an outwardly extending pivot member, while the inlet cover 54 may include a reciprocal cover pivot opening.

A link pivot member 82 may outwardly extend from the internal surface 66 of the base 60 within the internal chamber 64. The link pivot member 82 may be a tubular post, nub, stud, or the like. The link pivot member 82 is configured to be pivotally received within a link pivot opening 84 formed in the drain-covering link 56. As shown, the link pivot member 82 may be positioned to a side of the inlet 62. The link pivot member 82 may be below the cover pivot opening 78. Alternatively, a link pivot opening may be formed within the base 60, while the drain-covering link 56 includes a link pivot member.

The inlet cover 54 includes a covering flap 86 connected to a pivot arm 88. The cover pivot member 80 rearwardly extends from the pivot arm 88. The inlet cover 54 pivotally connects within the internal chamber 64 of the base 60 by way of the cover pivot member 80 being pivotally secured within the cover pivot opening 78. The inlet cover 54 is configured to be pivoted between a closed position, in which the covering flap 86 extends over at least a portion of the inlet 62, and an open position, in which the covering flap 86 is pivoted away from the inlet 62 so that the inlet 62 is open and exposed.

The drain-covering link 56 includes a main beam 90 through which the link pivot opening 84 is formed. The link 56 connects to the base 60 by way of the link pivot opening 84 pivotally securing over the link pivot member 82. The main beam 90 includes a cover spur 92 that upwardly extends above the link pivot opening 84. The cover spur 92 may include an inwardly curved distal tip 94 configured to be engaged by a hook 95 of the pivot arm 88.

The drain-covering link 56 also includes a drain plug or cover 96 at an opposite end from the cover spur 92. The drain cover 96 extends from the main beam 90 below the link pivot opening 84, and may be perpendicular with respect to the cover spur 92. For example, the cover spur 92 may be configured to be parallel with the front surface 68 of the base 60, while the drain cover 96 is configured to conform to a contour of the internal surface 66 of the receiving wall 58. The drain cover 96 may be curved to conform to the contour of the receiving wall 58. As explained below, when the assembly 50 is in the open position, in which the covering flap 86 is pivoted away from the inlet 62, the drain cover 96 is configured to be urged over and cover or plug the drain opening 70 to prevent fuel from passing therethrough. Conversely, when the assembly 50 is in the closed position, in which the covering flap 86 extends over at least a portion of the inlet 62, the drain cover 96 is separated from the drain opening 70, thereby exposing the drain opening 70 and allowing liquid to pass therethrough.

Figure 3:
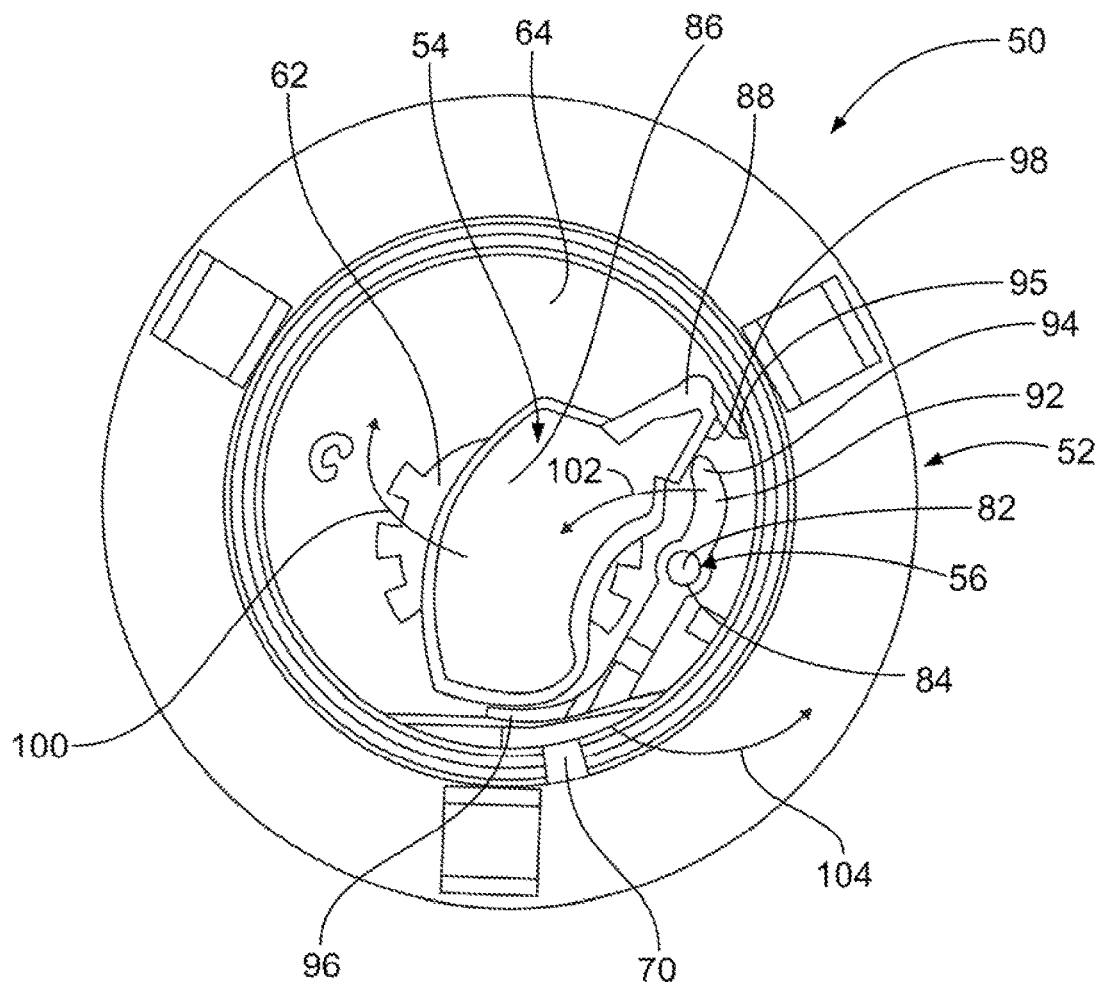
FIG. 3 illustrates a front view of a fuel nozzle-receiving assembly in a closed position with an open drain opening, according to an embodiment of the present disclosure.

FIG. 3 illustrates a front view of the fuel nozzle-receiving assembly 50 in a closed position with an open drain opening 70, according to an embodiment of the present disclosure. In the closed position, the covering flap 86 of the inlet cover 54 extends over or covers at least a portion of the inlet 52. As such, a nozzle may not pass into the inlet 52. In the closed position, a ramped lower edge 98 of the pivot arm 88 is biased into the distal tip 94 of the cover spur 92 of the drain-covering link 56. The engagement between the ramped lower edge 98 and the distal tip 94 ensures that the drain cover 96 is separated from the drain opening 70. As such, any liquid that may be within the internal chamber 64 passes out of the internal chamber 64 through the open drain opening 70.

When a fuel nozzle is inserted into the assembly 50 (such as a proper fuel nozzle that is able to engage and open the inlet cover 54), a distal end of the fuel nozzle is urged into the covering flap 86. With continued urging, the inlet cover 54 pivots open in the direction of arc 100, by way of the cover pivot member 80 pivoting in relation to the covering pivot opening 78 (shown in FIG. 2). As the inlet cover 54 continues to pivot open in the direction of arc 100, the ramped lower edge 98 slides on the distal tip 94 of the drain-covering link 56 until the hook 95 engages an outer surface of the cover spur 92. With continued urging in the direction of arc 100, the hook 95 forces the cover spur 92 to pivot inwardly in the direction of arc 102 about the pivot axis defined by the interface between the link pivot member 82 and the link pivot opening 84. Consequently, the portion of the main beam 90 below the link pivot opening 84 pivots in an opposite direction in the direction of arc 104. With continued urging, the drain cover 96 of the drain-covering link 56 seats over and covers or plugs the drain opening 70.

Figure 4:
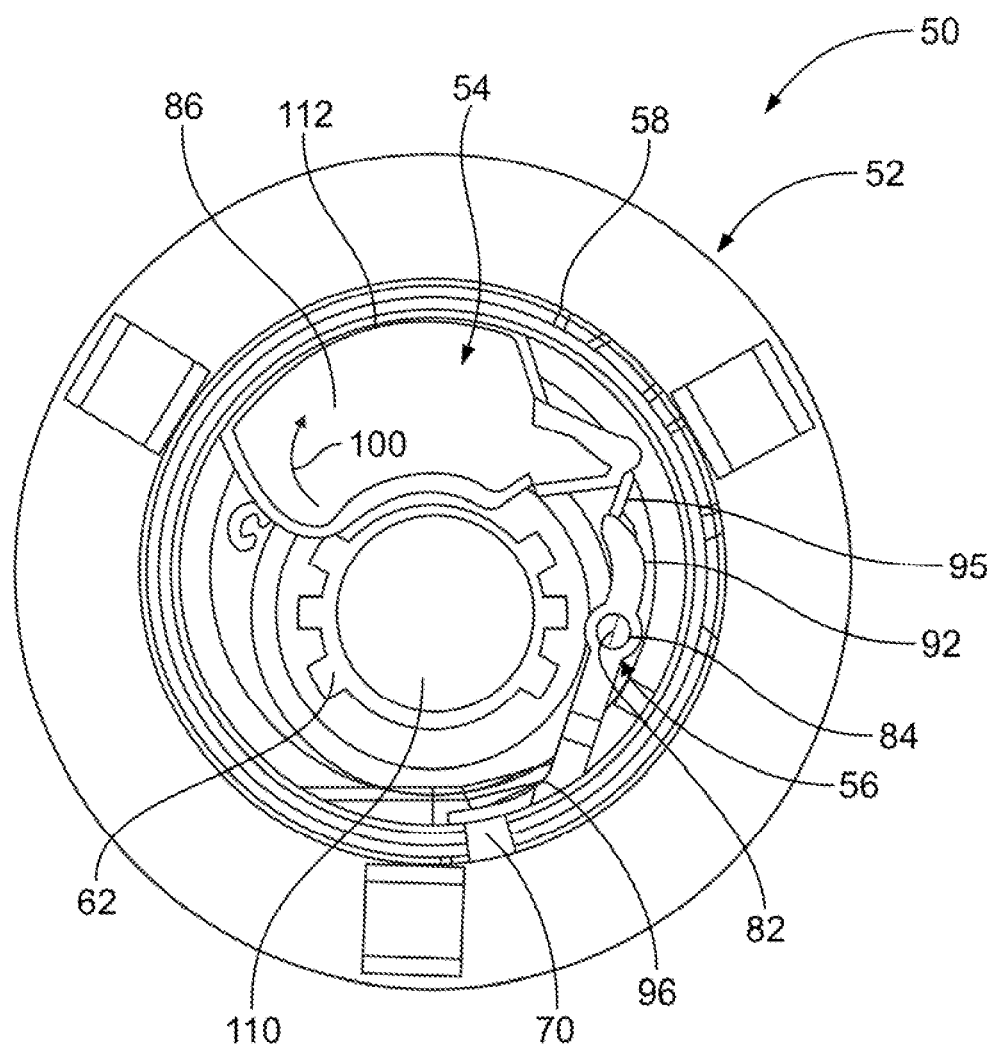
FIG. 4 illustrates a front view of a fuel nozzle-receiving assembly in an open position with a closed drain opening, according to an embodiment of the present disclosure.

FIG. 4 illustrates a front view of the fuel nozzle-receiving assembly 50 in an open position with a closed or plugged drain opening 70, according to an embodiment of the present disclosure. As shown, a fuel nozzle 110 is inserted into the inlet 62, thereby forcing the inlet cover 54 into an open position. The hook 95 of the inlet cover 54 engages the cover spur 92 of the drain-covering link 56, thereby forcing the drain cover 96 to seat over and cover the drain opening 70. The drain cover 96 may include a downwardly-extending protuberance that is configured to fit into the drain opening 70 to provide further sealing and plugging engagement. As such, fluid is prevented from passing into the drain opening 70. During fueling, when the fuel nozzle 110 is inserted into the inlet 62, any leaked fuel from the fuel nozzle 110 is prevented from passing into the plugged drain opening 70, and instead passes into the fuel fill pipe through the inlet 62.

When the fuel nozzle 110 is removed from the inlet 62, the inlet cover 54 and the drain-covering link 56 return to their at-rest closed positions, as shown in FIG. 3. While not shown, one or more springs may be used with the assembly 50 to move the inlet cover 54 and the drain-covering link 56 back to their at-rest positions when the fuel nozzle 110 is removed. For example, a spring-biased coil may be operatively connected between the link pivot member 82 and the link pivot opening 84.

As shown, the covering flap 86 may include a curved outer edge 112 that may generally conform to the curvature of the receiving wall 58. When the curved outer edge 112 abuts into the receiving wall 58, further pivotal movement of the inlet cover 54 in the direction of arc 100 is halted. As such, the receiving wall 58 may act as a positive stop that prevents over-pivoting or over-rotation of the inlet cover 54. Alternatively, the curved outer edge 112 may not conform to the curvature of the receiving wall 58, but instead may be various other shapes and sizes.

Figure 5:
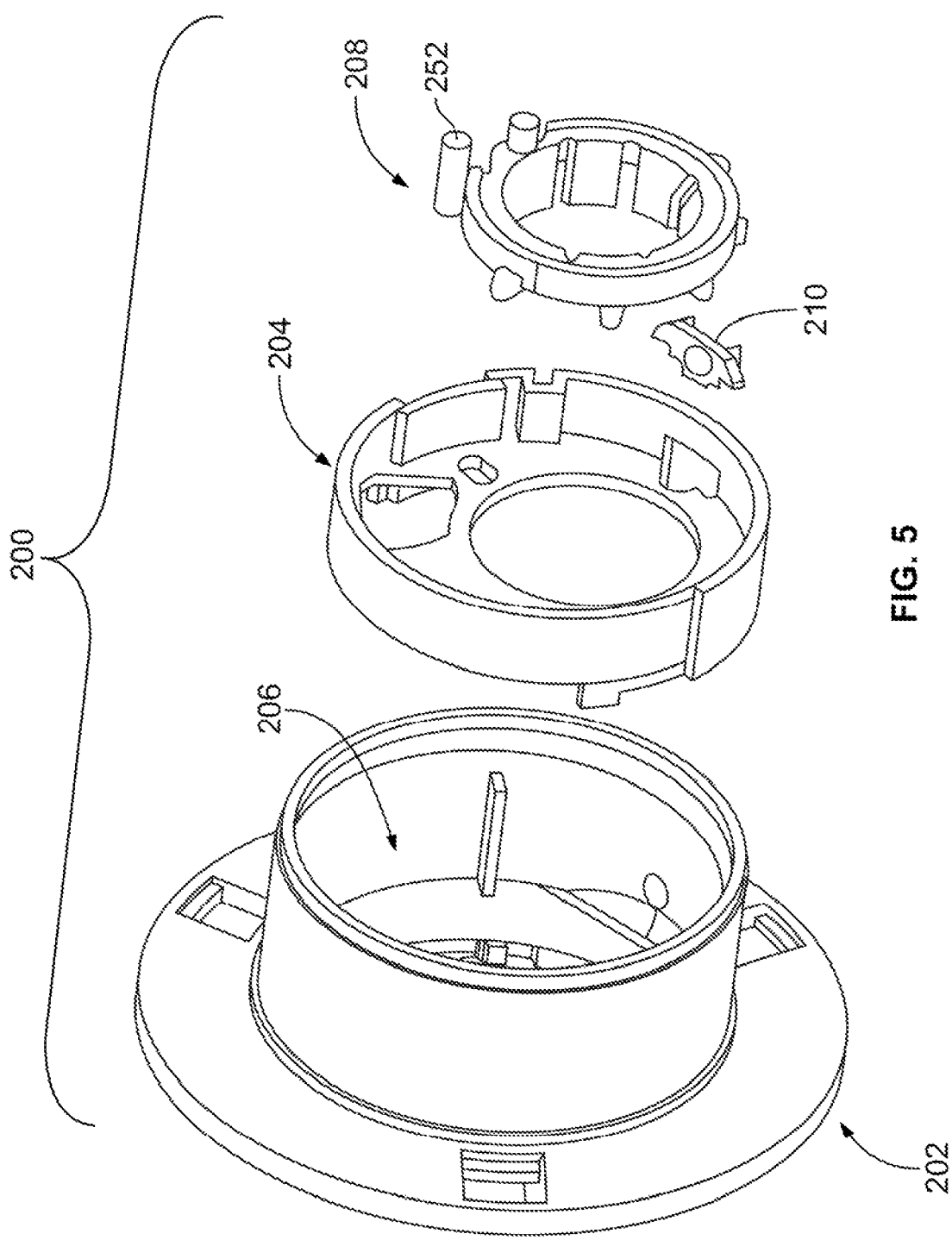
FIG. 5 illustrates a perspective exploded view of a fuel nozzle-receiving assembly, according to an embodiment of the present disclosure.

FIG. 5 illustrates a perspective exploded view of a fuel nozzle-receiving assembly 200, according to an embodiment of the present disclosure. The assembly 200 may include a main housing 202, similar to as described above, an internal or intermediate plate 204 configured to be secured within an internal chamber 206 of the main housing 202, an annular actuator 208 configured to be operatively secured to the main housing 202 and/or the internal plate 204, and a drain plug or cover 210. For the sake of clarity, the inlet cover, such as the inlet cover 54, is not shown in FIG. 5. While not shown, an actuating spring (such as a metal C-spring) may be secured to the actuator 208 and configured to maintain the actuator 208 in an at-rest position when there is no fuel nozzle inserted into the assembly 200.

The internal or intermediate plate 204 may be used with any of the embodiments of the present disclosure. The internal plate 204 is configured to provide separation between the cover and the actuator 208 so that they move smoothly in relation to one another during nozzle insertion. Alternatively, the assembly 200 may not include the internal plate 204. In such an embodiment, the actuator 208 may be configured to moveably secure to portions of the main housing 202.

Figure 6:
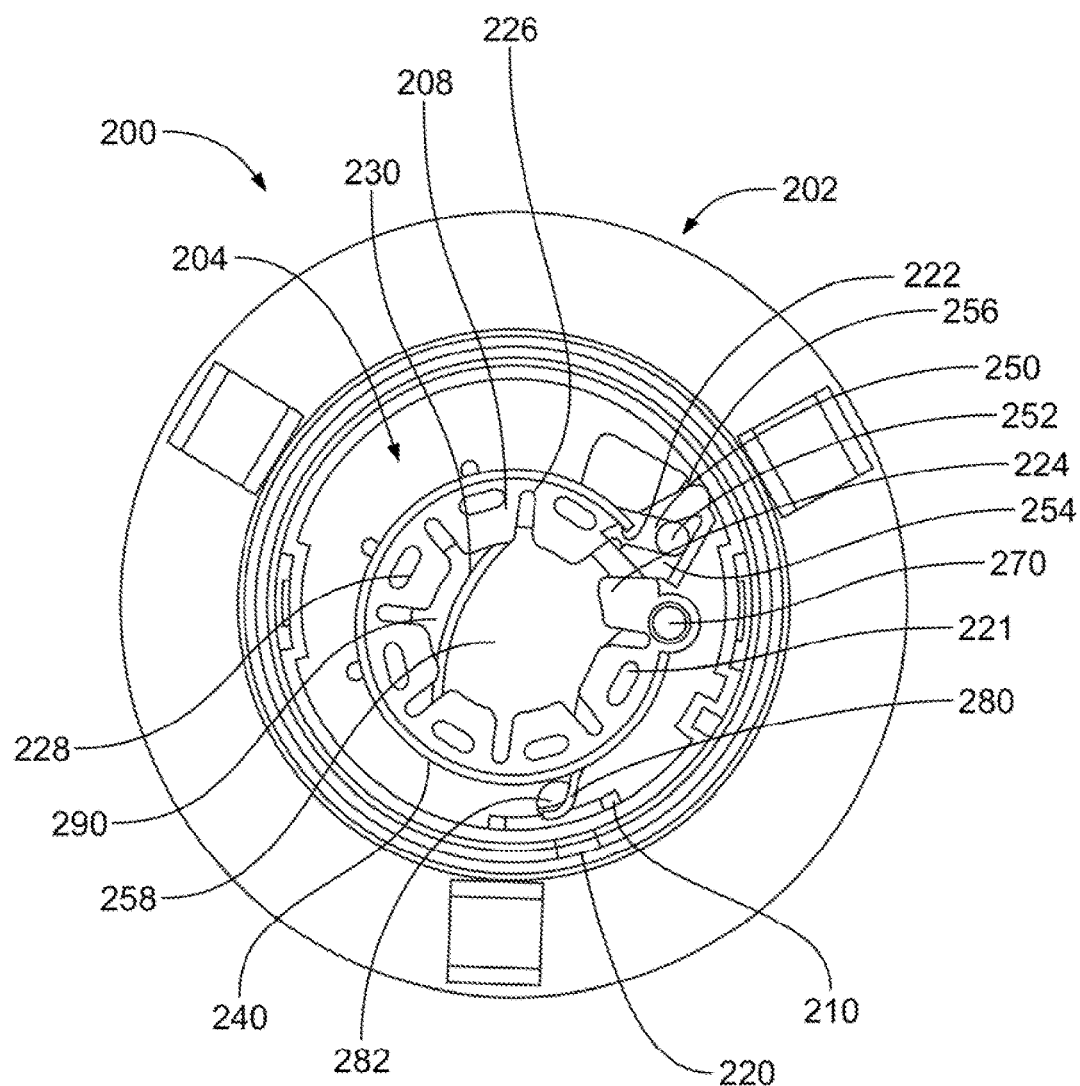
FIG. 6 illustrates a front view of a fuel nozzle-receiving assembly in a closed position with an open drain opening, according to an embodiment of the present disclosure.

FIG. 6 illustrates a front view of the fuel nozzle-receiving assembly 200 in a closed position with an open or unplugged drain opening 220, according to an embodiment of the present disclosure. The actuator 208 includes an arcuate body 221 in the shape of a C having ends 222 and 224. The arcuate body 221 may include a plurality of divots 226 between inwardly-directed protuberances 228. The divots 226 are configured to allow the protuberances 228 to flex inwardly and outwardly, thereby expanding an opening 230 defined by the arcuate body 221. The C-spring 240 may be secured around an outer portion of the arcuate body 221 to maintain the actuator 208 in a closed position in which the opening 230 is at a minimal size, as shown in FIG. 6.

A pivot arm beam 250 extends radially outward from the end 222. The pivot arm beam 250 includes a protuberance 252 that is moveably secured within a channel 254 formed in the pivot arm 256 of the inlet cover 258. A protuberance 270 extends from the opposite end 224 and is configured to be secured within a reciprocal opening formed in the internal plate 204 and/or the main housing 202.

A drain cover-engaging spur 280 extends radially downward from a lower surface of the actuator 208. The drain cover-engaging spur 280 includes a distal end 282 positioned over and secured to the drain cover 210.

In operation, as a fuel nozzle is inserted into the inlet 290, the nozzle forces the inlet cover 258 to pivot open, similar to as described above. As the inlet cover 258 pivots open, the protuberance 252 may move out of the channel 254. During this time, the outer circumference of the fuel nozzle may expand the opening 230 defined within the actuator 208. As such, the actuator 208 may spread open and expand in size, forcing the drain cover-engaging spur 280 to move the drain cover 210 over and plug the drain opening 220.

Figure 7:
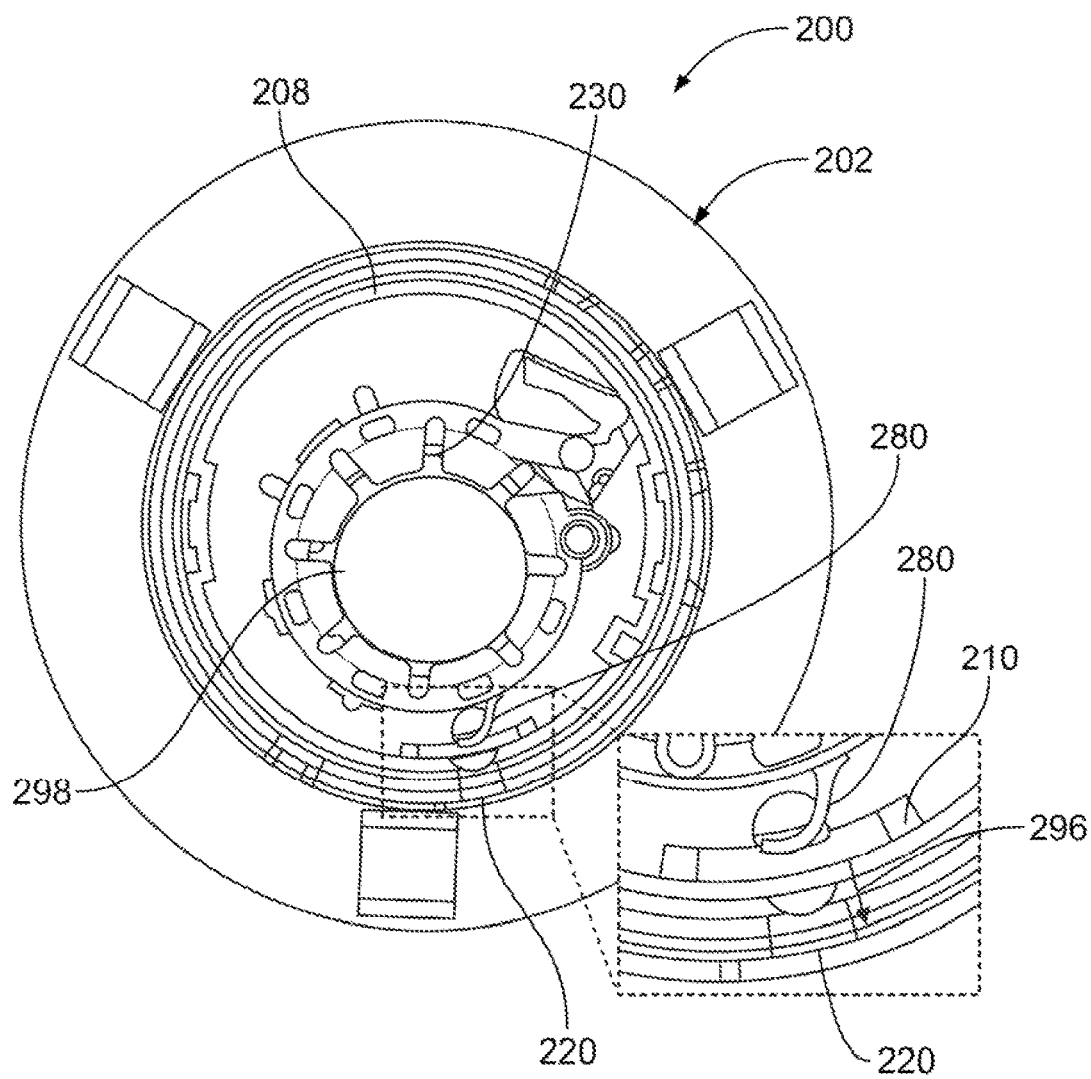
FIG. 7 illustrates a front view of a fuel nozzle-receiving assembly in an open position with a closing drain opening, according to an embodiment of the present disclosure.

FIG. 7 illustrates a front view of the fuel nozzle-receiving assembly 200 in an open position with a closing drain opening 220, according to an embodiment of the present disclosure. As shown in FIG. 7, as the fuel 298 is inserted into the assembly 200, the actuator 208 expands, thereby forcing the drain cover 210 towards the drain opening 220 in the direction of arrow 296. With full insertion of the fuel nozzle, the drain cover 210 seats over and plugs the drain opening 220. The drain cover 210 may include a downwardly-extending protuberance that is configured to fit into the drain opening 220 to provide further sealing and plugging engagement.

Figure 8:
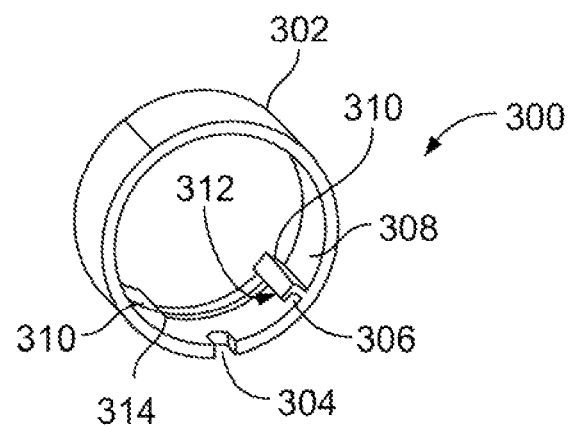
FIG. 8 illustrates a perspective rear view of a fuel nozzle-receiving assembly, according to an embodiment of the present disclosure.

FIG. 8 illustrates a perspective rear view of a fuel nozzle-receiving assembly 300, according to an embodiment of the present disclosure. The assembly 300 may include an annular main housing 302 that is configured to secure to a portion of a fuel intake system. A drain opening 304 is formed at a lower portion of the main housing 302.

A sleeve-retaining track 306 is formed on an internal surface 308 of the main housing 302. The drain opening 304 may be formed within the track 306. The track 306 may be defined by outer lateral ledges 310 that connect to a front ledge 312. Sleeve channels 314 are formed through the ledges 310 and 312 and are configured to slidably retain lateral edges of a drain covering sleeve (not shown in FIG. 8).

Figure 9:
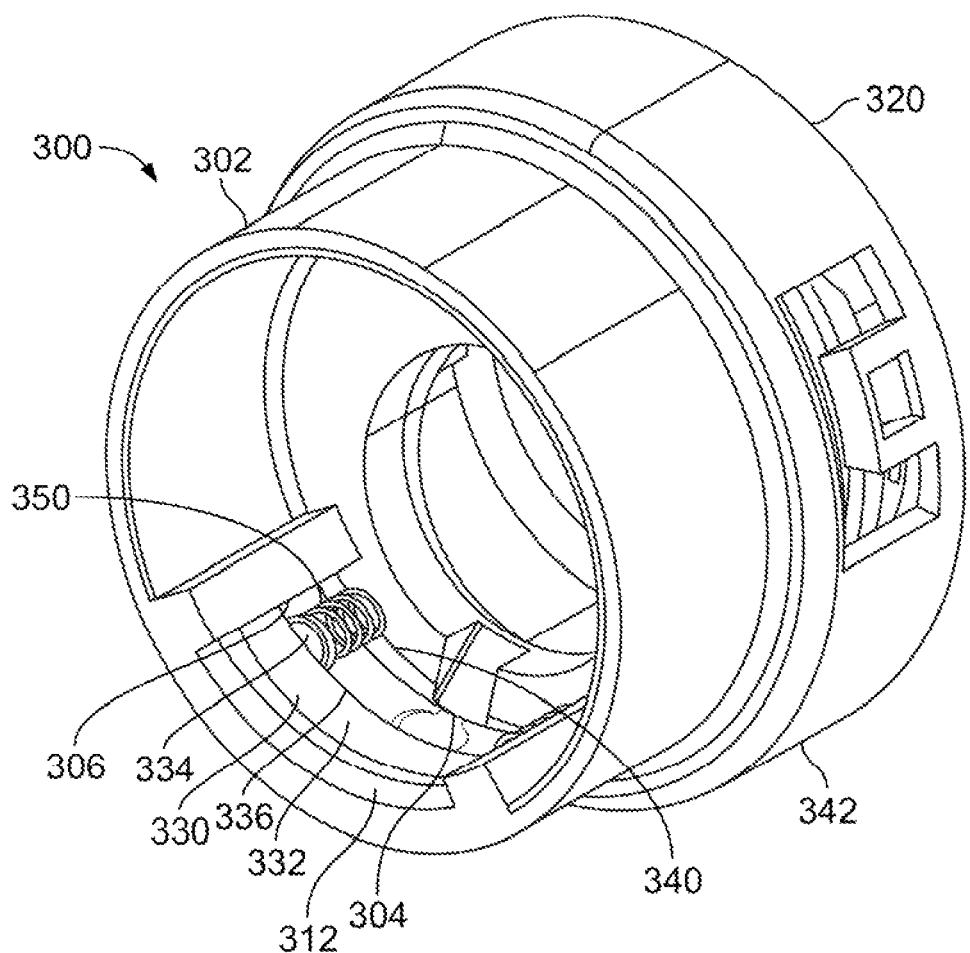
FIG. 9 illustrates a perspective front view of a fuel nozzle-receiving assembly with an open drain opening, according to an embodiment of the present disclosure.

FIG. 9 illustrates a perspective front view of the fuel nozzle-receiving assembly 300 with an open or unplugged drain opening 304, according to an embodiment of the present disclosure. As shown, the assembly 300 may be secured to a portion of a fuel intake system 320, such as a fuel fill pipe, a capless assembly, an MFI assembly, and/or the like.

A drain covering sleeve 330 is secured within the sleeve-retaining track 306. The drain covering sleeve 330 may be curved to conform to the shape of the main housing 302. The drain covering sleeve 330 includes a main covering body 332. One or more posts 334 are inwardly-directed from a rear edge 336 of the main covering body 332. The posts 334 are directed toward a front surface 340 of an interface 342 of the fuel intake system 320. Coil springs 350 may surround the posts 334 and are biased into the front surface 340. The coil springs 350 exert a force into the drain covering sleeve 330 and the front surface 340 that forces the drain covering sleeve 330 into the front ledge 312. As such, the drain opening 304 is opened, unplugged, and exposed.

Figure 10:
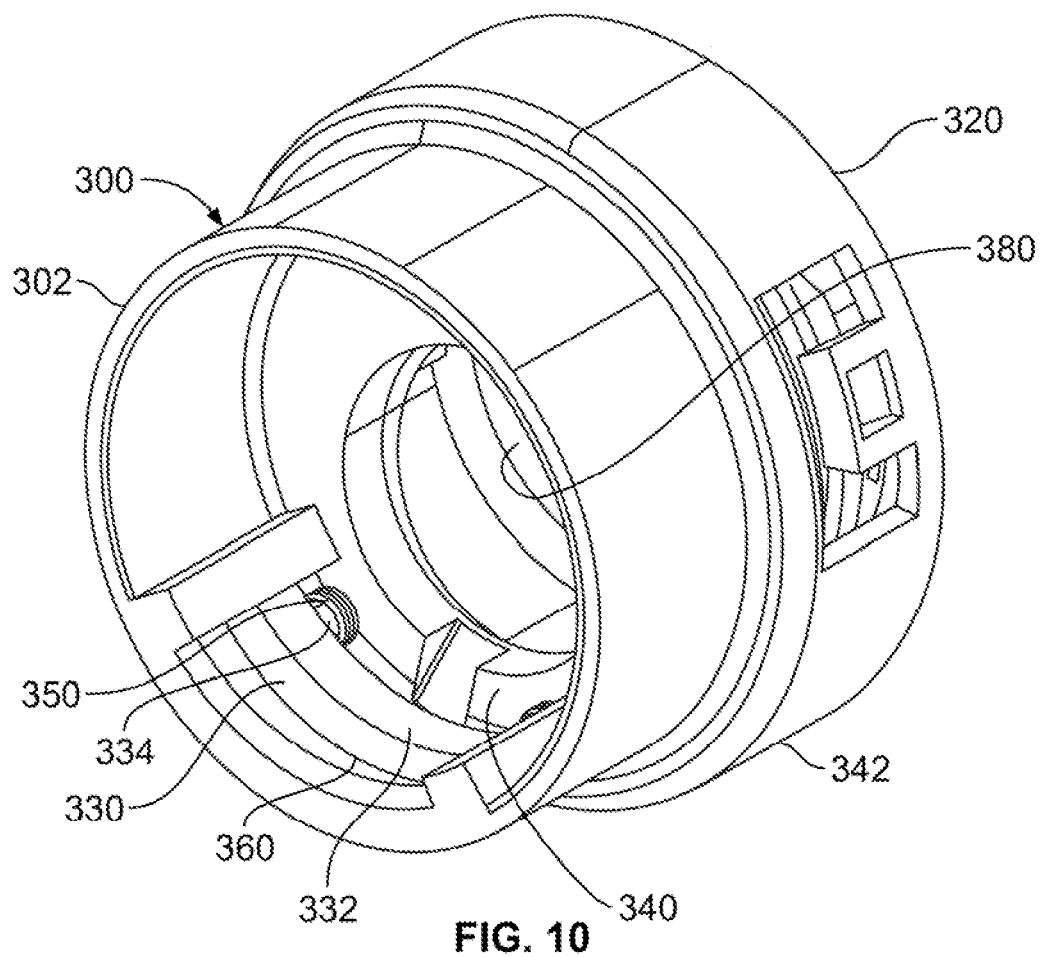
FIG. 10 illustrates a perspective front view of a fuel nozzle-receiving assembly with a closed drain opening, according to an embodiment of the present disclosure.

FIG. 10 illustrates a perspective front view of the fuel nozzle-receiving assembly 300 with a closed or plugged drain opening 304 (hidden from view), according to an embodiment of the present disclosure. As a fuel nozzle is inserted into the assembly 300, a portion of the fuel nozzle, such as a ridge 19 (shown in FIG. 1), engages a front edge 360 of the main covering body 332, forcing the drain covering sleeve 330 inwardly toward the front surface 340 of the interface. As the drain covering sleeve 330 is moved inward, the force exerted by the fuel nozzle into the main covering body 332 compresses the coil springs 350. During this time, the main covering body 332 covers or plugs the drain opening 304. The main covering body 332 may include a downwardly-extending protuberance that is configured to fit into the drain opening 304 to provide further sealing and plugging engagement.

The main covering body 332 remains in the covered or plugged position so long as the fuel nozzle remains within the assembly 300 and exerts sufficient force into the main covering body 332. When the fuel nozzle is removed, the coil springs 350 expand and force the drain covering sleeve 330 back to the at-rest position, as shown in FIG. 9.

The embodiment shown in FIGS. 8-10 may be used with a fuel nozzle-receiving assembly that may or may not include an inlet cover, such as the inlet cover 54, that is used to prevent an improper fuel nozzle from being inserted. As shown in FIGS. 9 and 10, for example, an inlet 380 may be exposed and opened when the drain opening 304 is open and closed.

Referring to FIGS. 1-10, embodiments of the present disclosure provide fuel nozzle-receiving assemblies that are configured to allow liquid to drain during times when a fuel nozzle is not inserted, while closing the drain when the fuel nozzle is inserted. As such, undesired liquids, such as water, are drained from the assemblies, while any leaked fuel from the fuel nozzle may be passed to a fuel tank.

Also, embodiments of the present disclosure may be moved between plugged and unplugged positions (in relation to the drain cover), as well as open and closed positions (in relation to the inlet cover) by insertion of any nozzle that is able to engage portions of the assemblies in a manner similar to a fuel nozzle. For example, a nozzle of a bottle of fuel additive may engage the assemblies and move the inlet and drain covers, as described above.

Embodiments of the present disclosure provide drain covers, such as any of those described above, including the drain cover 96, the drain cover 210, or the drain covering sleeve 330, that may formed of one or more resilient materials, such as rubber, that tend to move out of a drain hole when a fuel nozzle is removed from an fuel nozzle-receiving assembly. For example, the drain covers may be spring-loaded due to the natural stiffness of the resilient material. The drain covers described above may or may not be secured to links, actuators, or the like.

Embodiments of the present disclosure provide fuel nozzle-receiving assemblies that prevent fuel from leaking during a filling operation. A drain hole is closed or plugged during refueling, and opened or unplugged when the fuel nozzle is removed. The opened drain openings allow water and other liquids to drain out of the assemblies.

Embodiments of the present disclosure may be used with or without MFI assemblies. Further, embodiments of the present disclosure may be used with capped or capless fuel intake systems.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

Various features of the disclosure are set forth in the following claims.

The invention claimed is:

1. A fuel nozzle-receiving assembly, comprising:
a main housing having an inlet configured to receive a fuel nozzle;
a drain opening formed through a portion of the main housing in front of and below the inlet; and
a drain cover configured to be moved between a plugged position in which the drain opening is closed, and an unplugged position in which the drain opening is opened, wherein the drain cover is configured to be in the plugged position when the fuel nozzle is inserted into the inlet so that any leaked fuel passes into the inlet.

2. The fuel nozzle-receiving assembly of claim 1, wherein the drain cover is configured to be in the unplugged position when the fuel nozzle is not inserted into the inlet so that liquid within the main housing drains through the drain opening.

3. The fuel nozzle-receiving assembly of claim 1, further comprising a movable inlet cover configured to be moved between a closed position in which the inlet cover covers at least a portion of the inlet and an open position in which the inlet is opened.

4. The fuel nozzle-receiving assembly of claim 3, wherein the drain cover is configured to be in the unplugged position when the inlet cover is in the closed position, and wherein the drain cover is configured to be in the plugged position when the inlet cover is in the open position.

5. The fuel nozzle-receiving assembly of claim 1, further comprising:
a drain covering link pivotally secured to the main housing; and
an inlet cover pivotally secured to the main housing, wherein movement of the inlet cover to an open position forces the drain covering link to move the drain cover toward the plugged position.

6. The fuel nozzle-receiving assembly of claim 5, wherein the drain covering link includes a cover spur at a first end and the drain cover at a second end that is opposite from the first end, wherein at least a portion of the inlet cover is configured to engage the cover spur to move the drain cover between the plugged and unplugged positions.

7. The fuel nozzle-receiving assembly of claim 1, further comprising an actuator operatively connected to the drain cover, wherein the actuator is configured to expand to move the drain cover to the plugged position, and wherein the actuator is configured retract to move the drain cover to the unplugged position.

8. The fuel nozzle-receiving assembly of claim 7, further comprising a C-ring secured around the actuator.

9. The fuel nozzle-receiving assembly of claim 7, further comprising an inlet cover configured to be moved between open and closed positions, wherein movement of the inlet cover toward the open position causes the actuator to expand, and wherein movement of the inlet cover toward the closed position causes the actuator to retract.

10. The fuel nozzle-receiving assembly of claim 1, wherein the drain cover comprises a drain covering sleeve slidably retained within a sleeve-retaining track.

11. The fuel nozzle-receiving assembly of claim 10, wherein the drain covering sleeve is spring-biased.

12. The fuel nozzle-receiving assembly of claim 10, wherein the drain covering sleeve is configured to be inwardly moved to the plugged position by insertion of the fuel nozzle into the inlet, and wherein the drain covering sleeve is configured to be outwardly biased in the unplugged position to expose the drain plug.

13. A fuel nozzle-receiving assembly, comprising:
a main housing defining an internal chamber and including an inlet configured to receive a nozzle;
a drain opening formed through a portion of the main housing in front of and below the inlet, wherein the drain opening is configured to allow liquid to drain therethrough; and
a drain cover configured to be moved between a plugged position in which the drain opening is closed so that liquid is prevented from passing therethrough, and an unplugged position in which the drain opening is opened so that the liquid is able to pass therethrough, wherein the drain cover is configured to be in the plugged position when the nozzle is inserted into the inlet, and wherein the drain cover is configured to be in the unplugged position when the nozzle is not inserted into the inlet.

14. The fuel nozzle-receiving assembly of claim 13, further comprising a movable inlet cover configured to be moved between a closed position in which the inlet cover covers at least a portion of the inlet and an open position in which the inlet is opened, wherein the drain cover is configured to be in the unplugged position when the inlet cover is in the closed position, and wherein the drain cover is configured to be in the plugged position when the inlet cover is in the open position.

15. The fuel nozzle-receiving assembly of claim 13, further comprising:

a drain covering link pivotally secured to the main housing, wherein the drain covering link includes a cover spur at a first end and the drain cover at a second end that is opposite from the first end; and an inlet cover pivotally secured to the main housing, wherein movement of the inlet cover to an open position forces the drain covering link to move the drain cover toward the plugged position, wherein at least a portion of the inlet cover is configured to engage the cover spur to move the drain cover between the plugged and unplugged positions.

16. The fuel nozzle-receiving assembly of claim 13, further comprising:

an actuator operatively connected to the drain cover, wherein the actuator is configured to expand to move the drain cover to the plugged position, and wherein the actuator is configured retract to move the drain cover to the unplugged position; and an inlet cover configured to be moved between open and closed positions, wherein movement of the inlet cover toward the open position causes the actuator to expand, and wherein movement of the inlet cover toward the closed position causes the actuator to retract.

17. The fuel nozzle-receiving assembly of claim 16, further comprising a C-ring secured around the actuator.

18. The fuel nozzle-receiving assembly of claim 13, wherein the drain cover comprises a spring-biased drain covering sleeve slidably retained within a sleeve-retaining track, wherein the drain covering sleeve is configured to be inwardly moved to the plugged position by insertion of the nozzle into the inlet, and wherein the drain covering sleeve is configured to be outwardly biased in the unplugged position to expose the drain plug.

19. A fuel nozzle-receiving assembly, comprising:

a main housing having an inlet configured to receive a fuel nozzle;

a drain opening formed through a portion of the main housing;

a drain cover configured to be moved between a plugged position in which the drain opening is closed, and an unplugged position in which the drain opening is opened, wherein the drain cover is configured to be in the plugged position when the fuel nozzle is inserted into the inlet so that any leaked fuel passes into the inlet;

a drain covering link pivotally secured to the main housing; and an inlet cover pivotally secured to the main housing, wherein movement of the inlet cover to an open position forces the drain covering link to move the drain cover toward the plugged position.

20. The fuel nozzle-receiving assembly of claim 19, wherein the drain covering link includes a cover spur at a first end and the drain cover at a second end that is opposite from the first end, wherein at least a portion of the inlet cover is configured to engage the cover spur to move the drain cover between the plugged and unplugged positions.

21. A fuel nozzle-receiving assembly, comprising:

a main housing defining an internal chamber and including an inlet configured to receive a nozzle;

a drain opening formed through a portion of the main housing, wherein the drain opening is configured to allow liquid to drain therethrough;

a drain cover configured to be moved between a plugged position in which the drain opening is closed so that liquid is prevented from passing therethrough, and an unplugged position in which the drain opening is opened so that the liquid is able to pass therethrough, wherein the drain cover is configured to be in the plugged position when the nozzle is inserted into the inlet, and wherein the drain cover is configured to be in the unplugged position when the nozzle is not inserted into the inlet;

a drain covering link pivotally secured to the main housing; and an inlet cover pivotally secured to the main housing, wherein movement of the inlet cover to an open position forces the drain covering link to move the drain cover toward the plugged position.

22. The fuel nozzle-receiving assembly of claim 21, wherein the drain covering link includes a cover spur at a first end and the drain cover at a second end that is opposite from the first end, wherein at least a portion of the inlet cover is configured to engage the cover spur to move the drain cover between the plugged and unplugged positions.

* * * * *